US010793338B2

(12) United States Patent
Heap et al.

(10) Patent No.: US 10,793,338 B2
(45) Date of Patent: Oct. 6, 2020

(54) APPARATUS AND METHODS FOR TRANSPORTING AND CONDITIONING PANELS CONTAINING PHASE CHANGE MATERIALS

(71) Applicant: Fisher Clinical Services Inc., Allentown, PA (US)

(72) Inventors: Royce Russell Heap, Horsham (GB); Michael A. Buss, Breinigsville, PA (US); Richard A. Cardillo, II, Allentown, PA (US); Desmond Charlery, Downingtown, PA (US); Minerva Galoiu, Easton, PA (US); Gail R. Mello, Allentown, PA (US)

(73) Assignee: Fisher Clinical Services Inc., Allentown, PA (US)

(*) Notice: Subject to any disclaimer, the term of this patent is extended or adjusted under 35 U.S.C. 154(b) by 71 days.

(21) Appl. No.: 15/918,134

(22) Filed: Mar. 12, 2018

(65) Prior Publication Data

US 2018/0282043 A1   Oct. 4, 2018

Related U.S. Application Data

(60) Provisional application No. 62/479,678, filed on Mar. 31, 2017.

(51) Int. Cl.
*B65D 81/18*       (2006.01)
*B65G 69/20*       (2006.01)

(52) U.S. Cl.
CPC ............. *B65D 81/18* (2013.01); *B65G 69/20* (2013.01); *B65G 2814/0311* (2013.01)

(58) Field of Classification Search
CPC ........ B65D 81/18; B65D 88/74; B65D 88/12; B65G 69/20; B65G 2814/0311;
(Continued)

(56) References Cited

U.S. PATENT DOCUMENTS 1,691,621 A * 11/1928 Young ..................... B62B 3/006
                                                                280/79.3
6,290,076 B1 * 9/2001 Sayers .................. A47B 43/02
                                                                211/41.1
(Continued)

FOREIGN PATENT DOCUMENTS

WO         2012088172 A2    6/2012
WO    WO2012088172 A2 *    6/2012
(Continued)

OTHER PUBLICATIONS

Intellectual Property Office, Search and Examination Report in GB1804402.4, dated Sep. 11, 2018.
(Continued)

*Primary Examiner* — Emmanuel E Duke
(74) *Attorney, Agent, or Firm* — Wood Herron & Evans LLP

(57) ABSTRACT

A rack for holding flat panels containing PCM while the flat panels are conditioned and a method of conditioning the flat panels. The rack includes a frame structure defining an interior through which a conditioning air flow is directed. The interior includes a plurality of vertically spaced shelves for supporting the flat panels in a vertically spaced apart arrangement. The shelves are configured to hold the flat panels with at least a majority of their upper and lower surfaces in contact with the conditioning air flow. A conditioning method includes arranging the flat panels in a spaced apart array in the rack to create air flow channels between adjacent surfaces of the flat panels. Air is circulated between and in contact with the flat panels at a first temperature sufficient to bring the temperature of the PCM in each flat panel at least closer to a required temperature range.

22 Claims, 12 Drawing Sheets

(58) Field of Classification Search
CPC .... F24F 5/0021; F25D 11/006; F28D 20/021; F28D 20/00; E04H 1/1238
See application file for complete search history.

(56) References Cited

U.S. PATENT DOCUMENTS

| | | |
|---|---|---|
| 7,905,075 B2 | 3/2011 | Flora |
| 8,424,335 B2 | 4/2013 | Corder et al. |
| 2015/0143840 A1* | 5/2015 | Ma ........................ B60P 3/20 62/457.2 |
| 2015/0227886 A1 | 8/2015 | Peters |
| 2015/0292787 A1 | 10/2015 | Kuhn et al. |
| 2016/0085277 A1* | 3/2016 | Samadiani ......... H05K 7/20809 361/679.53 |
| 2016/0362240 A1 | 12/2016 | Ferracamo, Jr. |

FOREIGN PATENT DOCUMENTS

| | | | |
|---|---|---|---|
| WO | WO-2012161718 A1 * | 11/2012 | ............ F25D 11/006 |
| WO | WO2012161718 A1 * | 11/2012 | |
| WO | 2014052440 A1 | 4/2014 | |
| WO | 2014094995 A2 | 8/2014 | |

OTHER PUBLICATIONS

Pelican Biothermal LLC, Credo Cube® Series 22 User Guide, 2015, 8 pgs.
Pelican Biothermal LLC, Credo Cube® Series 4 User Guide, 2015, 10 pgs.
Peli Biothermal, Credo® Returnable and Reusable Credo® System, Brochure, 2015, 4 pgs.

\* cited by examiner

APPARATUS AND METHODS FOR TRANSPORTING AND CONDITIONING PANELS CONTAINING PHASE CHANGE MATERIALS

CROSS REFERENCE TO RELATED APPLICATION

This application claims the benefit of U.S. Provisional Patent Application Ser. No. 62/479,678, filed Mar. 31, 2017, the disclosure of which is incorporated by reference herein in its entirety.

TECHNICAL FIELD

The present invention generally relates to apparatus and methods used for conditioning panels containing Phase Change Materials ("PCMs") for purposes of using those panels in shipping containers designed to maintain any contents within a required temperature range.

BACKGROUND

When shipping goods that are temperature sensitive, insulated, temperature controlled shipping containers are often used and may be lined with panels containing PCMs or "phase change materials." PCMs are thermal energy storage materials that can maintain a temperature-sensitive product within a required temperature range during transportation, such as from a manufacturer of the product or packager of the product to the end user. A required temperature range for many products may be between about +2° C. and about +8° C. PCMs are often used in combination with insulated shipping containers and the PCMs, in these cases, are contained within flat panels that line all six sides of the shipping container. That is, PCM panels will abut four sidewalls of the container as well as the top and bottom sides. PCMs are much more efficient than, for example, using only water or water-based coolants to protect the temperature sensitive product. Passive cooling systems such as those using PCM panels are usually designed to maintain a particular temperature range for a maximum and predetermined amount of time. This may be designed by the insulating characteristics of the shipping container taken together with the particular types of phase change materials used in the PCM panels. As a PCM changes its phase at, preferably, the required temperature range for the product, this will effectively extend the duration of required temperature control. That is, the product will be cooled via the latent heat transfer characteristics of the PCM. As such, PCM containing panels are very effective means to passively cool or warm shipping containers containing products, for example, related to clinical trials, biologics, tissue samples, pharmaceuticals, or other temperature sensitive items. Such items may be referred to as the "payload." Such items must often be transported in accordance with various laws, regulations or guidelines setting forth storage conditions. Because the outside temperatures during transport of such goods may vary widely, these containers present very effective and cost efficient means to ensure that the required temperature range within the container remains constant.

One challenge in this area of technology relates to the apparatus and processes surrounding "conditioning" of PCM panels prior to using those panels to pack and ship any required temperature sensitive items in the associated insulated containers. These panels must be precisely conditioned or brought to the required temperature range in a uniform and accurate manner. To reduce cost and increase efficiencies, this conditioning process and associated steps should occur as quickly as possible. This will achieve both the goals of ensuring that the product remains at the required temperature for the entire transportation or shipping process, and ensuring that conditioning and all other steps related to packaging the product are accomplished as timely as possible.

Some pre-conditioning and conditioning methods currently in use involve stacking PCM panels directly on top of one another. This can be problematic in that the direct contact between PCM panels can inhibit efficient and uniform heat transfer. In turn, this can lengthen the amount of time necessary for pre-conditioning and/or conditioning and may lead to the PCM in the panels achieving undesirable, non-uniform temperatures during an allotted time period. The achieved temperatures may also be outside of the desired or target temperature range. Other processes involve individually spacing PCM panels in vertical arrays using loose, individual spacer blocks. In these processes, vertically adjacent panels are separated by a plurality of individual, loose blocks placed directly on the panels and contacting respective panels above. For example, respective spacer blocks may be placed on each panel near the periphery or corners. Another panel is then placed on top of the spacer blocks. This stacking process is continued for a desired height of the vertical PCM panel array(s) within a pre-conditioning and/or conditioning unit (e.g., a freezer and a refrigerator). When pre-conditioning and conditioning hundreds of PCM panels, this will involve a number of loose spacer blocks equal to a multiple of the number of PCM panels. The handling of all these components therefore becomes very cumbersome and time consuming.

For these and other reasons, it would be desirable to provide methods and apparatus for optimizing the processes related to transporting and conditioning PCM panels for use during packaging and shipping of temperature sensitive products.

SUMMARY

The invention generally provides a rack that makes the pre-conditioning and conditioning processes much more efficient in various important regards. For example, the invention involves spacing each flat PCM panel from other PCM panels in a vertical array to allow very effective heat transfer. However, the invention eliminates the cumbersome use of individual spacer elements or blocks that have been used for this purpose and that have the disadvantages noted above. Among the various advantages of this invention, the racks and associated methods allow a large volume of flat PCM panels to be uniformly and efficiently pre-conditioned and conditioned with much less intensive handling of the panels and associated hardware, such as loose, individual spacer blocks.

Generally, a rack of the invention holds flat panels containing PCM while the flat panels are conditioned to a required temperature range for the PCM. The rack includes a frame structure with a front side and a rear side, a top side, bottom side, and at least two additional sides to define an interior. The frame structure is formed from a plurality of frame members through which a conditioning air flow is directed. The interior includes a plurality of vertically spaced shelves for supporting the flat panels in a vertically spaced apart arrangement. Each of the flat panels is configured with an upper surface and a lower surface, and the shelves are configured to hold the flat panels with at least a majority of the upper and lower surfaces in contact with the conditioning air flow.

The rack may have various additional features or aspects. For example, each of the shelves may further comprise first and second flanges spaced apart in a horizontal direction and fixed to respective frame members. The first and second flanges extend toward each other to define a slot for receiving at least one of the flat panels alongside edge portions thereof to create an air space between the first and second flanges for exposing a majority of the upper and lower surface of the flat panel to the conditioning air flow. The shelves may be configured in a first compartment to form a first vertical arrangement of the shelves having a first, front opening accessed from the front side of the rack. The rack may further comprise at least a second compartment of the shelves located adjacent to the first compartment. The second compartment is configured as a second vertical arrangement of the shelves having a second, front opening accessed from the front side of the rack. At least the first compartment of shelves may further comprise a second, rear opening accessed from the rear side of the rack. At least one stop element may be fixed between the first, front opening and the second, rear opening for preventing movement of the flat panels between front and rear compartments.

Panel securing mechanisms may be associated with each compartment. Each panel securing mechanism is movable between open and closed positions. The panel securing mechanisms allow the flat panels to be loaded onto the shelves of each compartment and unloaded from the shelves when in the open position. The panel securing mechanisms retain the flat panels on the shelves when in the closed position. The panel securing mechanisms may further comprise a vertically extending element that blocks the first, front opening when in the closed position and unblocks the first, front opening when in the open position. For example, the vertically extending element may be a bar.

The invention further provides a method of conditioning a plurality of flat panels containing PCM to bring the PCM in each flat panel into a required temperature range. The method includes arranging the flat panels in a spaced apart array to create air flow channels between adjacent surfaces of the flat panels. Air is circulated between and in contact with the flat panels at a first temperature sufficient to bring the temperature of the PCM in each flat panel at least closer to the required temperature range.

The method may include further aspects or steps. For example, circulating the air at the first temperature may further comprise a pre-conditioning step including circulating air between and in contact with the upper and lower surfaces of the flat panels at a first temperature sufficient to convert at least some of the PCM in each flat panel from the liquid phase to a solid phase wherein the first temperature is less than or equal to 0° C. The first temperature may have other values, depending on the characteristics of the particular PCM and the application needs. For example, other illustrative temperatures may be −5° C., −10° C. or −15° C. The method may further comprise a subsequent conditioning step including circulating air between and in contact with the flat panels at a second temperature that is higher than the first temperature to condition the flat panels and thereby bring the temperature of the PCM in each flat panel into the required temperature range. It should be noted that "circulating" the air may involve intermittent or continuous circulation by active means such as through the use of a fan or blower unit. Or, air may be circulated passively and, therefore, more slowly when no active circulation device is used in the pre-conditioning and/or conditioning unit. When conditioning the PCM panels, raising the temperature of the PCM in each panel may further comprise raising the temperature of the PCM into the required temperature range but below the PCM melting temperature range of the PCM or, more specifically, below the midpoint of the PCM melting temperature. As an illustrative example, the required temperature range may be +2° C. to +8° C. and the PCM melting temperature range may be +3.8° C. to +4.6° C. The midpoint of the PCM melting temperature range would be +4.2° C. in this example.

Arranging the flat panels may further comprise loading the flat panels into a rack having a plurality of spaced apart shelves configured to allow a majority of the outer surface area of each flat panel to be contacted by the circulating air. The method may further include transferring the rack from a pre-conditioning unit to a conditioning unit while the flat panels are held in the rack in order to respectively perform the pre-conditioning and conditioning steps. The method may further include loading the flat panels into the rack at a panel supplier prior to pre-conditioning and conditioning of the flat panels, shipping the rack of flat panels from the panel supplier to a remote location, and performing the pre-conditioning and conditioning steps at the remote location.

The method may further include unloading the conditioned panels from the rack, using the conditioned panels to package temperature sensitive items within insulated shipping containers, and shipping the temperature sensitive items in the insulated shipping containers while maintaining the temperature sensitive items within the required temperature range.

Loading the rack may further comprise loading the rack from both front and rear sides of the rack, and moving respective front and rear panel securing mechanisms to closed positions after loading the rack with the flat panels to retain the flat panels in the rack.

Various additional advantages and features will become more readily apparent to those of ordinary skill in the art upon review of the following detailed description of the illustrative embodiments taken in conjunction with the accompanying drawings.

DETAILED DESCRIPTION

Figure 1:
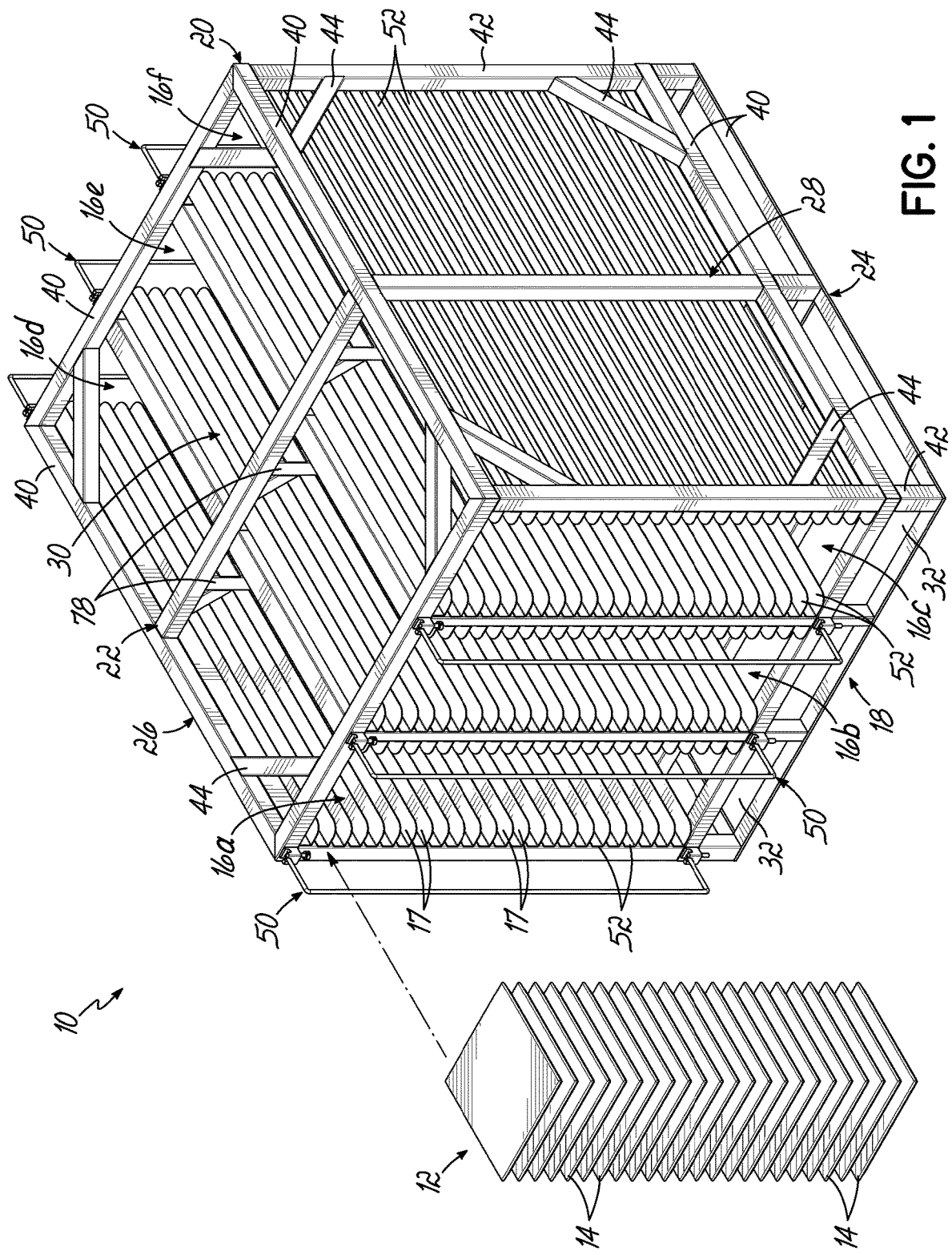
FIG. 1 is a perspective view of a rack configured to hold a plurality of PCM panels, and constructed in accordance with a first embodiment of the invention, and shown as receiving a first out of twelve columns of PCM panels.
Figure 2:
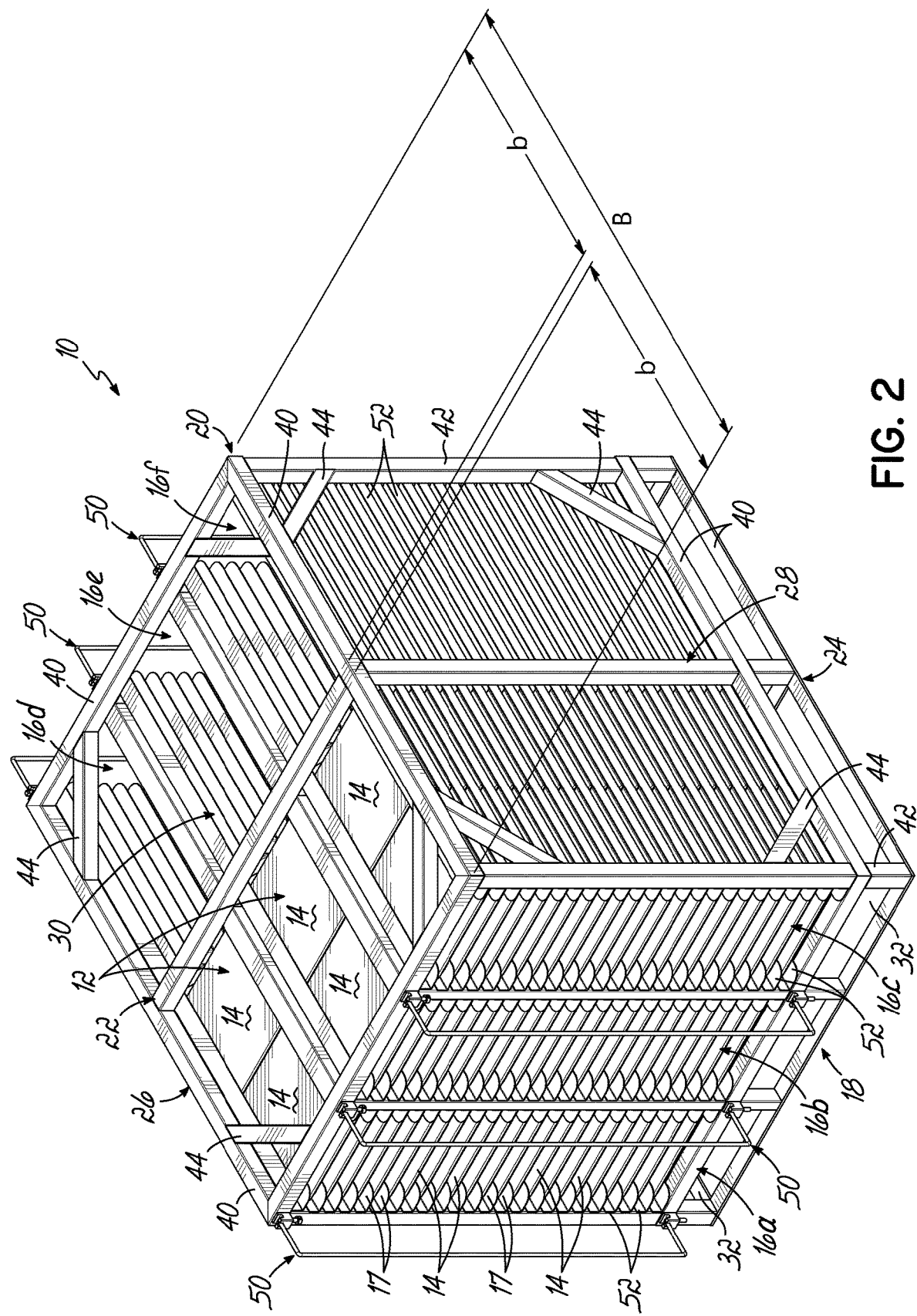
FIG. 2 is a perspective view similar to FIG. 1, but illustrating the rack containing six columns of spaced apart, horizontally oriented PCM panels in three of six compartments.

FIGS. 1 and 2 illustrate a PCM panel rack 10 constructed in accordance with a first exemplary embodiment. FIG. 1 schematically illustrates a column or stack 12 of spaced apart PCM panels 14 in an exploded view relative to a first compartment 16a of shelves or slots 17 into which the PCM panels 14 will be inserted. As will be appreciated, the embodiments described herein comprise six compartments 16a through 16f, however, any number of compartments may be provided. Three front compartments 16a, 16b, 16c may be accessed from a front side 8 of the rack 10 and three compartments 16d, 6e, 16f may be accessed from a rear side 20 of the rack 10. FIG. 2 illustrates one half of the storage rack 10 (i.e., compartments 16a, 16b, 16c) filled with respective columns 2 of PCM panels 14. In addition to the front and rear sides 18, 20, the rack 10 includes a top side 22, a bottom side 24 and two additional sides 26, 28 to define an interior 30. It will be noted that the storage rack 10 includes access from both front and rear sides 18, 20. In this regard, FIG. 2 illustrates the front side 18 as filled with two stacks or columns 12 of vertically spaced apart and horizontally oriented PCM panels 14 per compartment 16a-16c. At least a majority of the upper and lower surfaces of the panels 14 are exposed to conditioning air. These PCM panels 14 may have, for example, dimensions of approximately 9"×9"×¾" and/or 10"×10"×¾" (length×width×height). Of course, other dimensions may be used instead, and the shelves or slots 17 may be designed to accommodate panels 14 of more than one size at the same time. The storage rack 10 is configured to have an overall dimension or footprint that equates to a standard pallet size in the U.S. The rack embodiments shown and described herein essentially have an "integrated" pallet at their bottom portion. This is for ease of handling. The bottom "integrated" pallet design may be substituted with a separate pallet or pallet-like structure (such as a U.S. or European pallet) bolted or otherwise fixed to the bottom surface of a storage rack, such as rack 10 or other embodiments within the scope of the invention. The chosen dimensions of either an integrated or separate pallet structure may correspond to other situations, such as to other standard pallet sizes. The various overall dimensions of a storage rack constructed within the scope of this invention may vary widely, as may the various configurations of compartments, slots and other features. For example, dimensions may be changed to accommodate panels 14 of various sizes or for other purposes necessitated or desired by a particular market or user(s). More specific description of representative dimensions is provided below for illustrative purposes only. The bottom portion of the rack 10 includes spaces 32 for receiving forks of a lift and transport mechanism such as a fork lift or rolling jack device. Although not shown, the bottom side 24 of the storage rack 10 may have rollers or casters that may be lockable, instead of or in addition to the spaces 32 for receiving the forks of a lift.

Still referring to FIGS. 1 and 2, the storage rack 10 is comprised of horizontal frame members 40, which are preferably made from a metal such as stainless steel or aluminum, and vertical frame members 42 suitably strengthened, such as at the corners, by angled frame members 44. These various frame members 40, 42, 44 may be rigidly fixed to each other by welding. Both the front and the rear access sides 18, 20 to each compartment 16a-16f of shelves or slots 17 include panel securing mechanisms 50. These will be described in further detail below. Each compartment 16a-16f in the rack 10 includes inwardly extending flanges 52 spaced apart along each side thereof for supporting the opposite lower edge portions of each panel 14. It will be appreciated from the description to follow, that each slot or shelf 17 defined by the opposed flanges 52 in each compartment 16a-16f may hold two panels 14 as shown in FIG. 2, or any other number of panels 14 depending on the desired dimensions of the rack 10 and the respective panels 14. Depending on the vertical dimension between adjacent flanges 52 on each side of a compartment 16a-16f, as well as the height or thickness of the panels 14, the flanges 52 may contact both upper and lower surfaces of the panels 14. As shown, the flanges 52 may only contact lower surfaces of the panels 14. The flanges 52 may be spaced apart vertically such that the panels 14 are also spaced apart to create conditioning or temperature controlled airflow regions therebetween while the panels 14 are stored in the rack 10. This assists with convective heat transfer during a pre-conditioning and conditioning process as will be further described. The vertical or height dimension "h" of each air flow gap or space (FIGS. 5 and 7) in various embodiments normally would not be greater than the thickness of the panel 14. The goal is to prevent panels 14 on the same shelf 17 from sliding on top of one another during any movement of the rack 10. The vertical or height dimension "h" of each air flow gap or space is more specifically discussed below along with other illustrative dimensions.

Figure 3A:
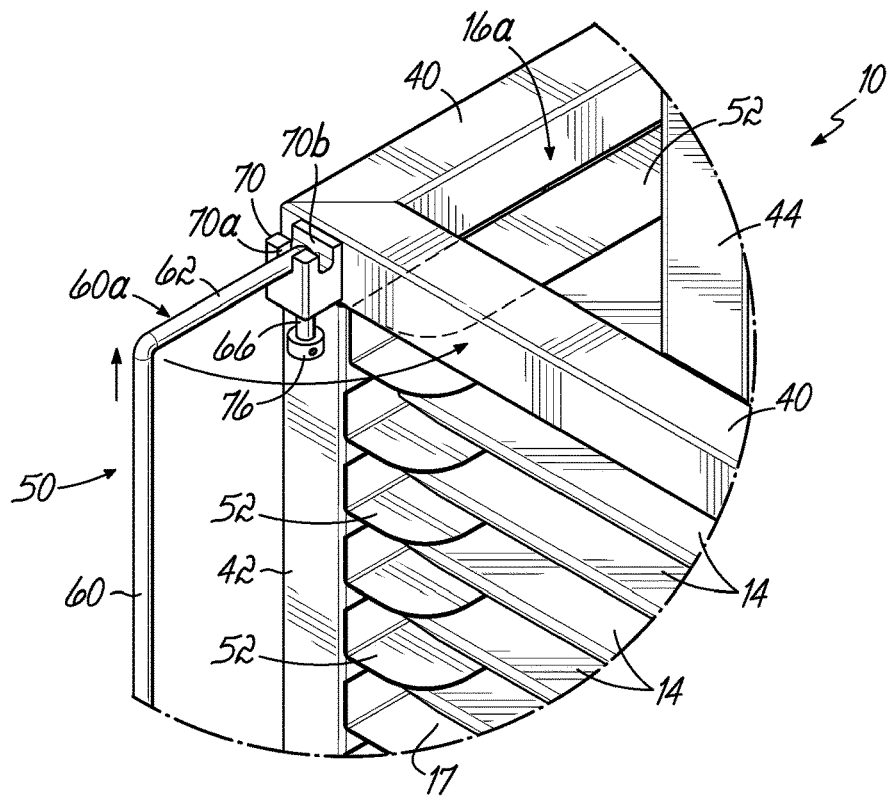
FIG. 3A is an enlarged, perspective view of the rack shown in FIGS. 1 and 2, further illustrating the upper portion of a PCM panel securing mechanism in an open position.
Figure 3B:
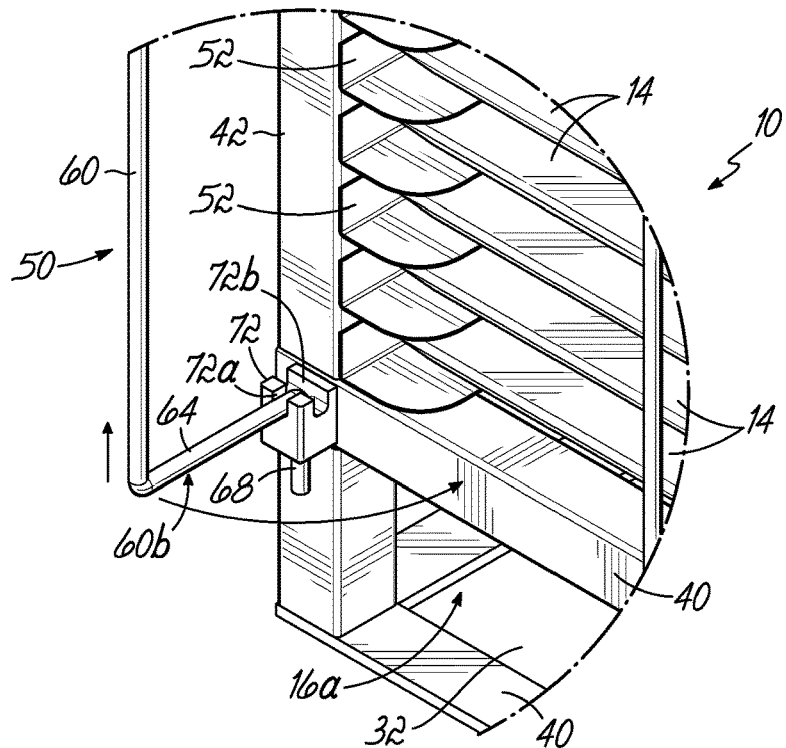
FIG. 3B is a perspective view similar to FIG. 3A, but illustrating a lower portion of the PCM panel securing mechanism.
Figure 4A:
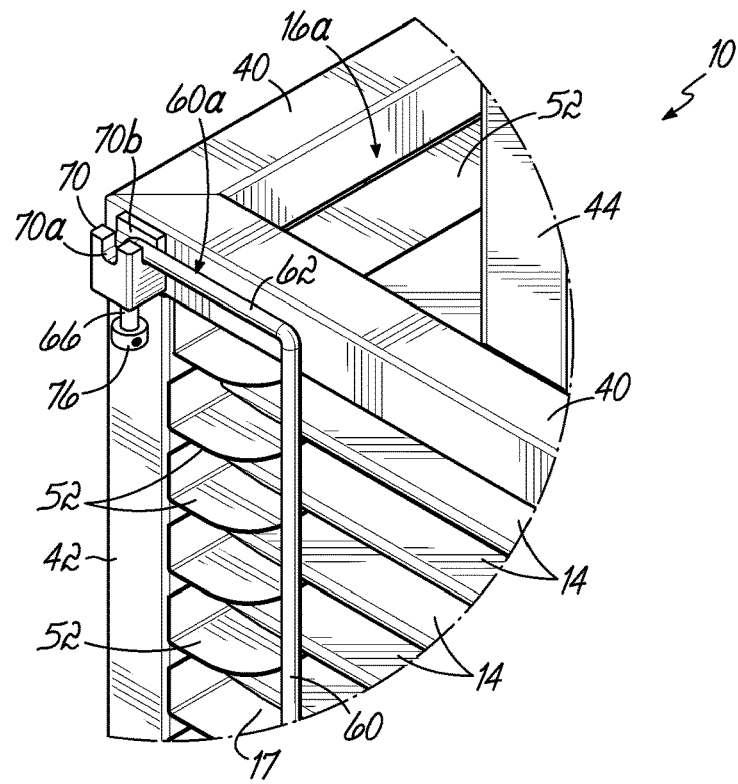
FIGS. 4A and 4B are perspective views similar to FIGS. 3A and 3B, but illustrating the PCM panel securing mechanism in a closed position.
Figure 4B:
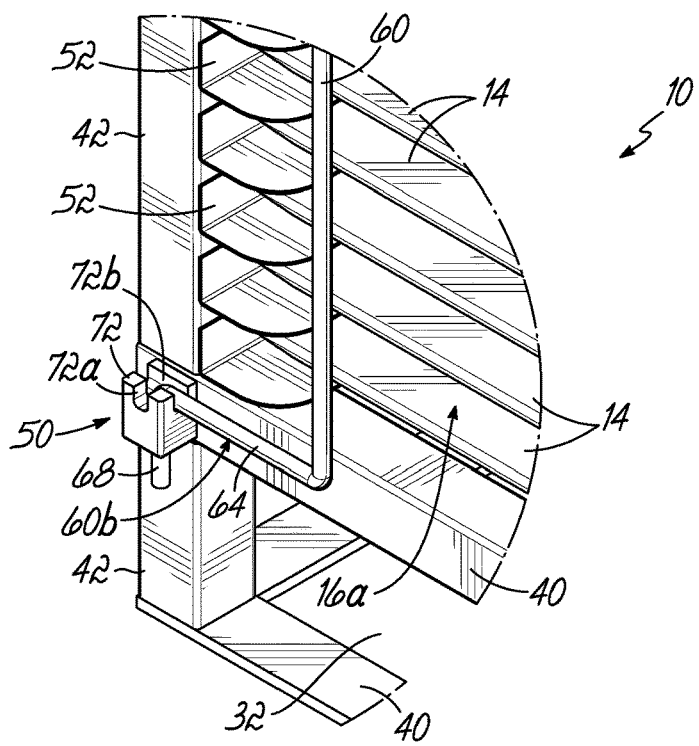

The panel securing mechanism 50 is shown in greater detail with reference to FIGS. 3A, 3B, 4A and 4B. FIGS. 3A and 3B show the respective upper and lower portions of one panel securing mechanism 50. The mechanism 50 comprises a vertical bar 60 connected to upper and lower sections 60a, 60b. The upper and lower sections 60a, 60b include respective horizontal portions 62, 64 and vertical portions 66, 68. The vertical portions 62, 64 are pivotally held within respective mountings 70, 72 attached rigidly to frame members 40 and/or 42. Slots 70a, 72a in the mountings 70, 72 define the open position shown in FIGS. 3A and 3B by receiving the upper and lower horizontal portions 62, 64. A stop 76 is connected to the vertical upper pivoting portion 66 to prevent the bar 60 from being lifted completely out of the mountings 70, 72. The stop 76 bears against the upper mounting 70 when the horizontal portion 62 is lifted out of the slot 70a. To move the vertical panel securing bar 60 between the open position shown in FIGS. 3A and 3B and the closed position shown in FIGS. 4A and 4B, the bar 60 is lifted out of the front slots 70a, 72a, rotated 90° and positioned within the other slots 70b, 72b by lowering the bar 60 and the respective horizontal portions 62, 64. When in the closed position, the vertical panel securing bar 60 can bear against the respective flat PCM panels 14 of a column 12 contained in the slots and prevent the panels 14 from inadvertently falling out of the rack 10 during movement such as transportation, shipping or transfer operations. The columns 12 of panels 14 are effectively restrained between the securing mechanisms 50 (vertical bars 60) along one side and a centrally located vertical frame member 78 (see FIGS. 1, 5 and 6) extending and fixed along an opposite side of each front and rear compartment 16a-16f. When the securing mechanisms 50 are in the open positions shown in FIGS. 3A and 3B, the PCM panels 14 are easily inserted into and removed from the respective slots 17. Again, access is provided at the front and rear sides 18, 20 of the rack 10 for ease and speed of use.

Figure 5:
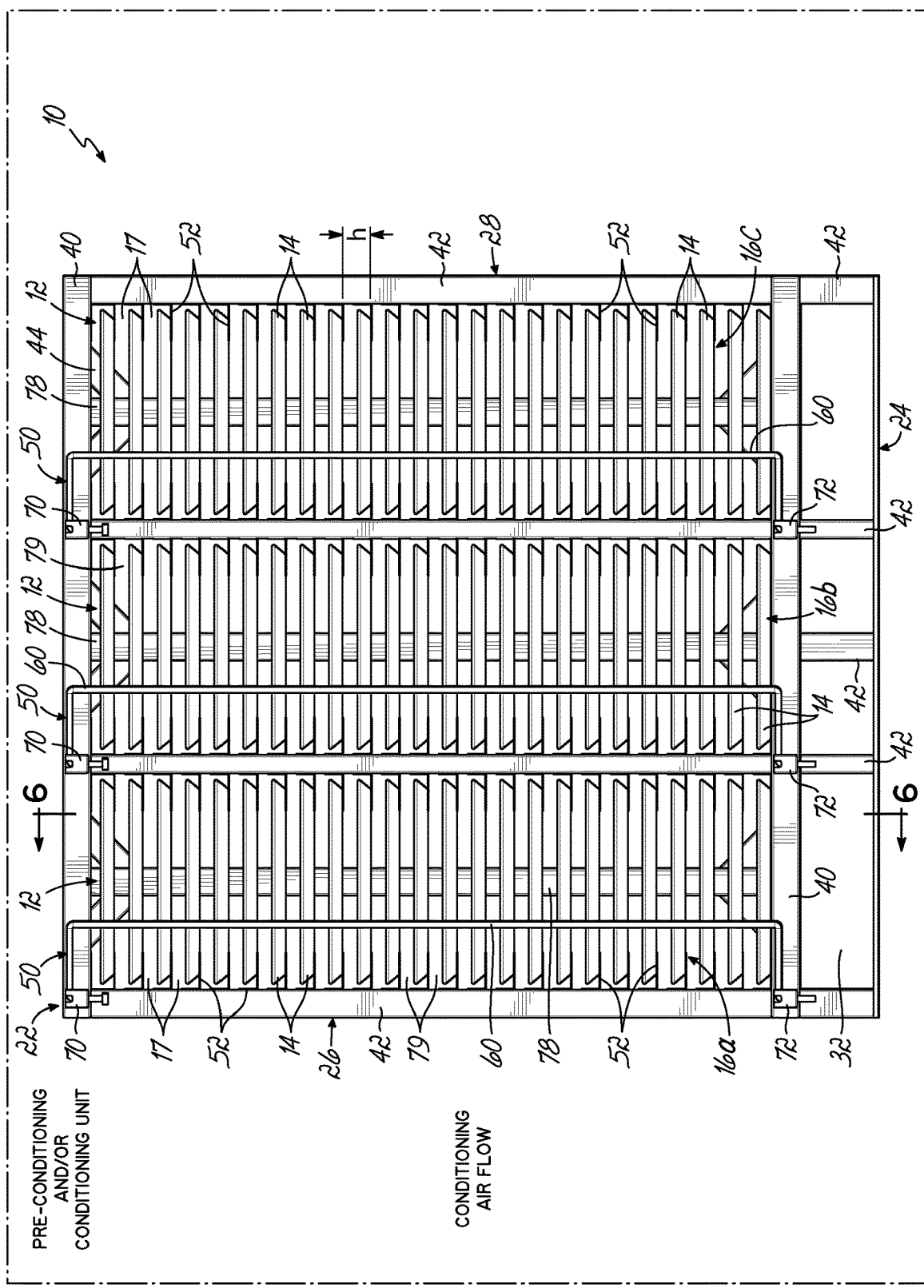
FIG. 5 is a front elevational view of the rack as shown in FIG. 2, illustrating the PCM panel securing mechanisms in their closed position.
Figure 6:
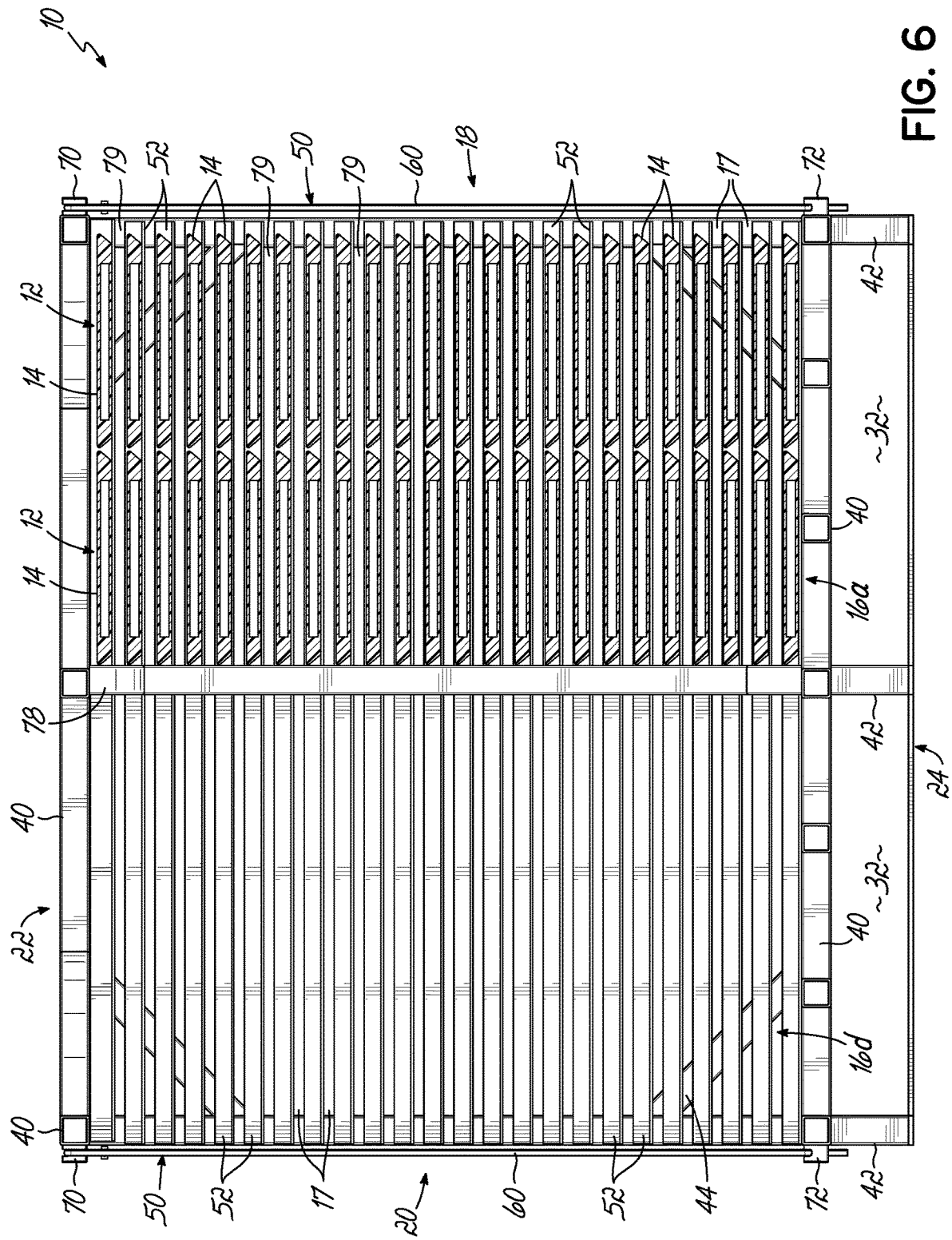
FIG. 6 is a cross sectional view taken along line 6-6 of FIG. 5.
Figure 7:
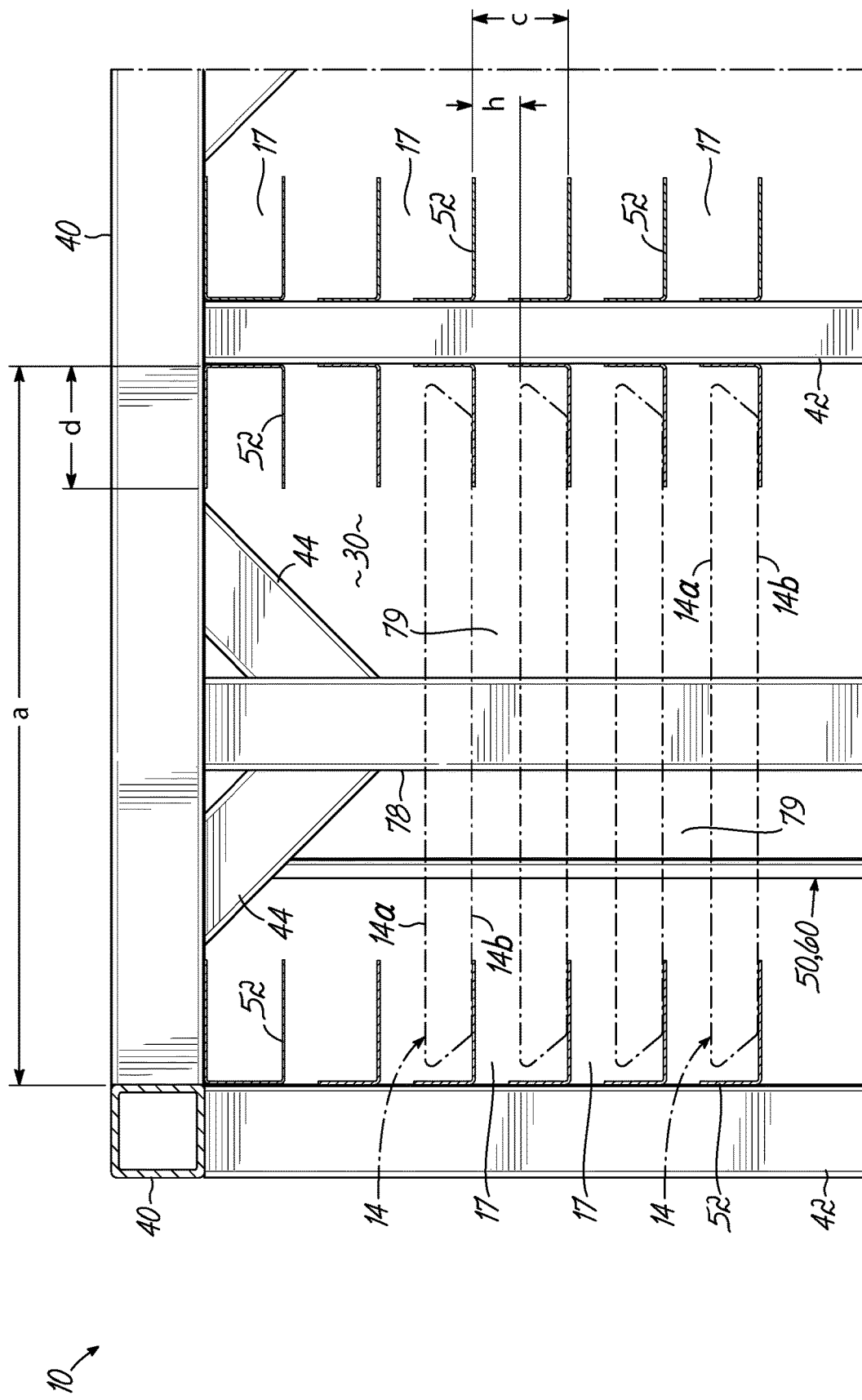
FIG. 7 is an enlarged, elevational view illustrating PCM panels in dash-dot lines stored on respective flanges of the rack illustrated in FIGS. 1-6, and designed to create respective slots containing the panels.
Figure 8:
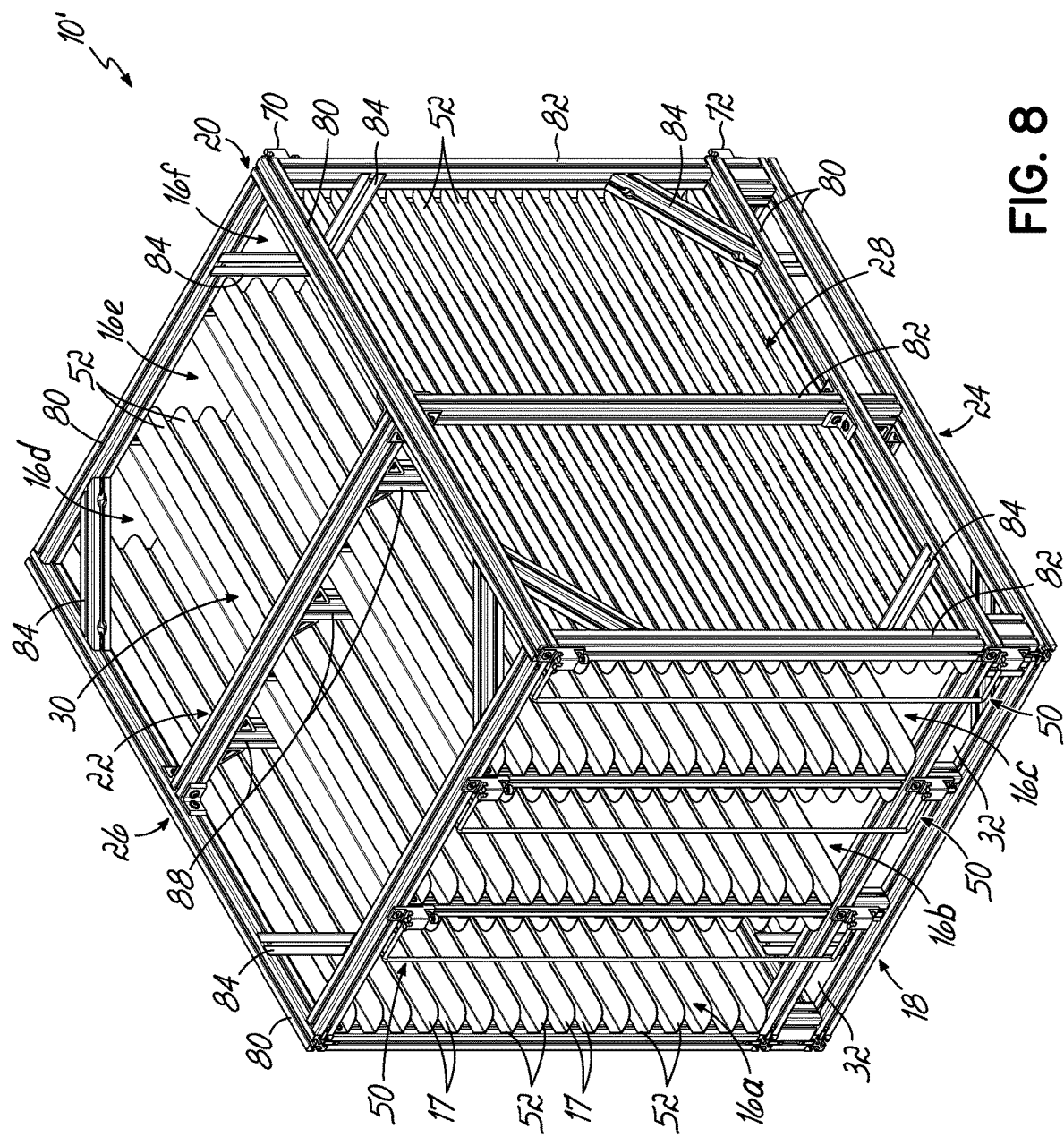
FIG. 8 is a perspective view of an exemplary, alternative embodiment of a PCM panel conditioning and storage rack.

FIGS. 5 through 7 are additional views illustrating how the PCM panels 14 are contained within the storage rack 10. FIG. 5 is a front elevational view illustrating stacks or columns 12 of panels 14 contained in the three front compartments 16a-16c of slots and held in place between the securing mechanisms 50 and vertical frame members 78 that bisect the front and rear compartments 16a-16f (FIG. 1) of the storage rack 10. In this embodiment, each slot contains a single layer of at least one and, preferably, two PCM panels 14 and this creates significant airflow gaps 79 between the vertically spaced apart panels 14 to allow temperature controlled air to be actively directed across substantially all outer surface area of each panel 14 for more effective and efficient temperature control during the pre-conditioning and conditioning steps described below. Referring to FIG. 5, the height or vertical dimension "h" of each air flow gap 79 may have a range of dimensions. As previously mentioned, there are benefits to ensuring that the height "h" of this air flow gap 79 is small enough to prevent one panel 14 from "riding over" an adjacent panel 14 in the same compartment (16a-16f). More generally, height "h" may have a ratio of about 0.5 to about 1.5 times the thickness of each panel 14. The benefits discussed above would be realized when this ratio is maintained below about 1.0 while being understood that air flow constraints may offset these benefits as well as the added benefits of being able to accommodate more shelves or slots 17 when using closer vertical spacing of flanges 52. As best illustrated in FIG. 6, each slot 17 includes two panels 14 in a lengthwise direction situated end-to-end as shown. The rear half (e.g., compartment 16d) of the storage rack 10 has not yet been filled with panels 14 and, as such, simply illustrates the empty slots 17 defined by the respective, vertically spaced flanges 52. FIG. 7 illustrates an enlarged view of several PCM panels 14 shown in dash-dot lines and supported by flanges 52 on the bottom along opposite side portions thereof. This exposes each surface of each PCM panel 14 that is not in contact with a flange 52 to temperature controlled pre-conditioning or conditioning air that will pass between the spaced apart PCM panels 14 within the storage rack 10, as further discussed below.

Referring more specifically to FIGS. 2 and 7, rack 10 has three front facing compartments 16a, 16b and 16c and three rear facing compartments 16d, 16e and 16f. At each vertical shelf level, rack 10 is dimensioned to accommodate twelve PCM panels 14, two within each front facing compartment and two within each rear facing compartment. Thus, for PCM panels 14 which are 10.25 inches (265 mm) in width and depth, each compartment can be 296.3 mm in width "a" (FIG. 7) and 590.5 mm in depth "b" (FIG. 2). In this example, the total depth "B" (FIG. 2) of rack 10 may be 1219.2 mm. For PCM panels which are 11.25 inches (285 mm) in width and depth, each compartment can be 296.3 mm in width "a" (FIG. 7) and 590.5 mm in depth "b" (FIG. 2). For this example, the total depth "B" (FIG. 2) of rack 10 again may be 1219.2 mm. Either of these two possible panel sizes may be used while still holding two panels 14 end-to-end in each compartment 16a-16f. Also, with appropriate sizing of flanges 52, racks with compartment dimensions of 296.3 mm in width "a" (FIG. 7) and 590.5 mm in depth "b" (FIG. 7) can accommodate either 265×265 mm panels or 285×285 mm panels 14.

In yet other embodiments, each front facing compartment 16a, 16b and 16c and each rear facing compartment 16d, 16e and 16f can be dimensioned to accommodate one 13.25× 13.25 inch (340×240 mm) PCM panel 14. The six compartment arrangement shown in the Figures can also be configured to accommodate at least one PCM panel 14 and the panels 14 may be of various sizes.

In other embodiments, there are more than or fewer than six compartments. For example, a rack with two front facing compartments and two rear facing compartments can accommodate four PCM panels 14 on each vertical shelf level, with each compartment dimensioned in accordance with the dimensions of the PCM panel 14, e.g., 16.25×16.25 inches (415×415 mm). That same four compartment geometry (2×2 on each vertical level) can also be used with two or more PCM panels 14 in each compartment at the same vertical shelf level, especially if such PCM panels 14 are rectangular (but not square) in shape.

In some embodiments, the dimensions may differ between different compartments within one rack. For example, a rack may have two front-facing compartments of one size and three rear-facing compartments of a smaller size or may have one front facing compartment and three rear facing compartments of one size and one front facing compartment of the same depth, but twice the width as the other four compartments. In other embodiments, two front facing compartments and two rear facing compartments each could be of the same dimensions and a fifth compartment could have the same width and twice the depth of the other four compartments and extend from the front to the back and be open at both ends, and not be blocked by a centrally located vertical member 78 (FIGS. 1 and 7).

In most embodiments there are at least two front facing compartments and at least two rear facing compartments. But in some embodiments there is only one front facing compartment, only one rear facing compartment or only one of each. Any other configurations, sizing and/or number of compartments may be used depending on the particular needs of an application.

In certain embodiments, and referring to FIG. 7, the vertical spacing or distance "c" between levels (measured between horizontal surfaces of vertically adjacent flanges 52 on which PCM panel 14 rest) is between about 25 mm and about 50 mm. For example, using PCM panels of 0.75 inch (20 mm) thickness, a vertical spacing "c" of 40 mm between levels (measured at the horizontal surfaces of adjacent flanges 52) will provide an airflow gap 79 having a height dimension "h" (FIGS. 5 and 7) of 20 mm in height between the top surface of one PCM panel 14 and the bottom surface of the PCM panel 14 immediately above it. A vertical spacing "c" of 35 mm between levels would provide an airflow gap dimension "h" of 15 mm for PCM panels 14 that are 20 mm in thickness. A vertical spacing "c" of 45 mm between levels would provide an airflow gap dimension "h" of 25 mm for PCM panels 14 that are 20 mm in thickness or an airflow gap dimension "h" of 20 mm for PCM panels 14 that are 25 mm in thickness and thus provide additional flexibility in which sizes of PCM panels 14 a particular rack can accommodate. Depending upon the thicknesses of the PCM panels 14 for which a particular rack is designed, the vertical distance "c" between flanges 52 can be dimensioned to yield an airflow gap 79 with a vertical dimension "h" in a range of, for example, about 5 mm to about 35 mm. Each flange 52 may have a width "d" (FIG. 7) that ensures the desired air contact with both upper and lower surfaces 14a, 14b of each panel 14. For example, relative to the dimensions given above for illustrative purposes only, the width "d" of each flange 52 may be in the range of 10 mm to 80 mm. A larger width "d" will allow the shelf or slot 17 to hold panels 14 having a wider range of widths but allowing less contact with air on the lower panel surface 14b due to the portions resting on flanges 52. A goal in various embodiments is to have at least a majority of each panel surface 14a, 14b in contact with air, i.e., not in contact with a flange 52.

Figure 9:
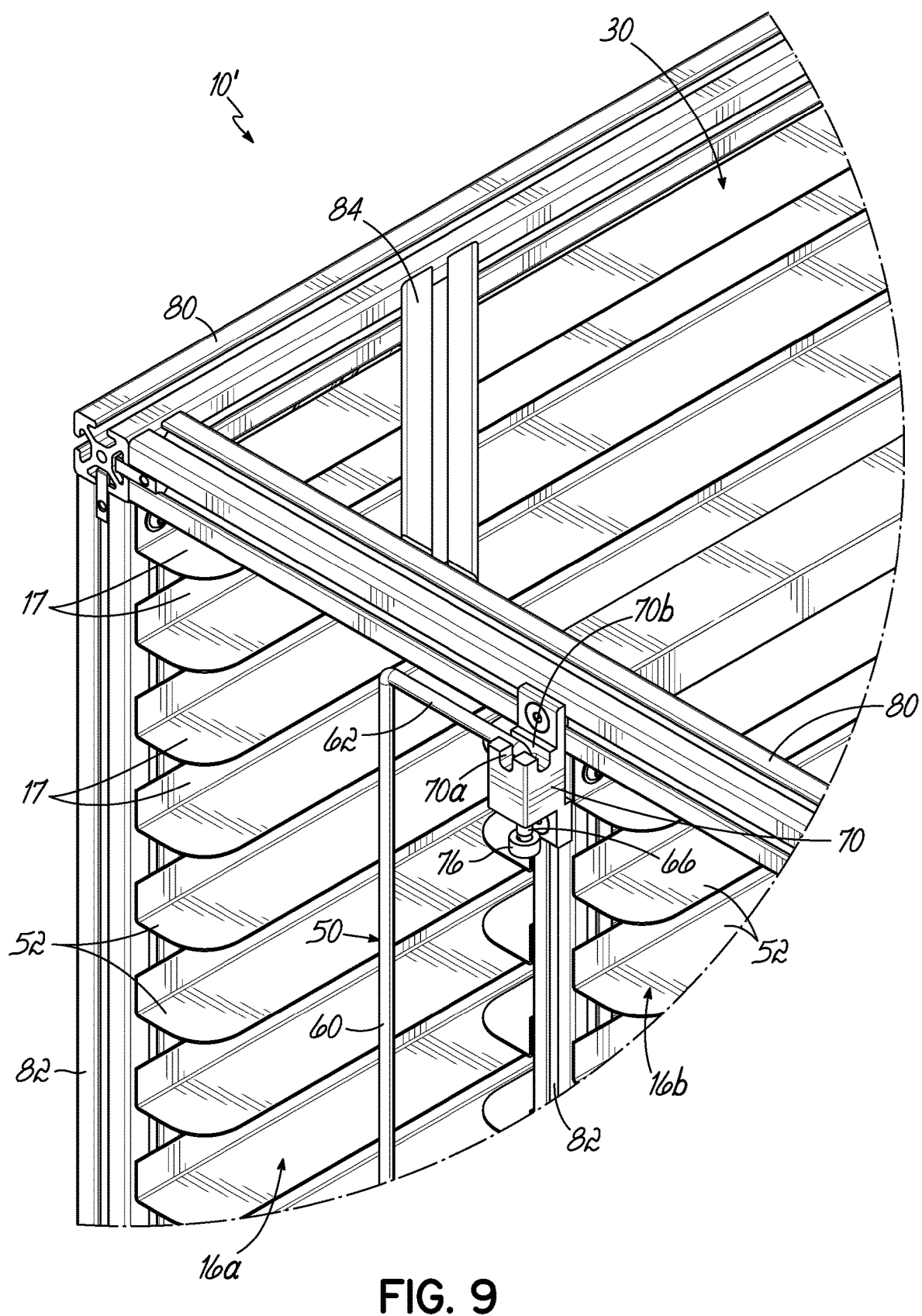
FIG. 9 is an enlarged perspective view of the rack shown in FIG. 8, illustrating a PCM panel securing mechanism in a closed position.
Figure 10:
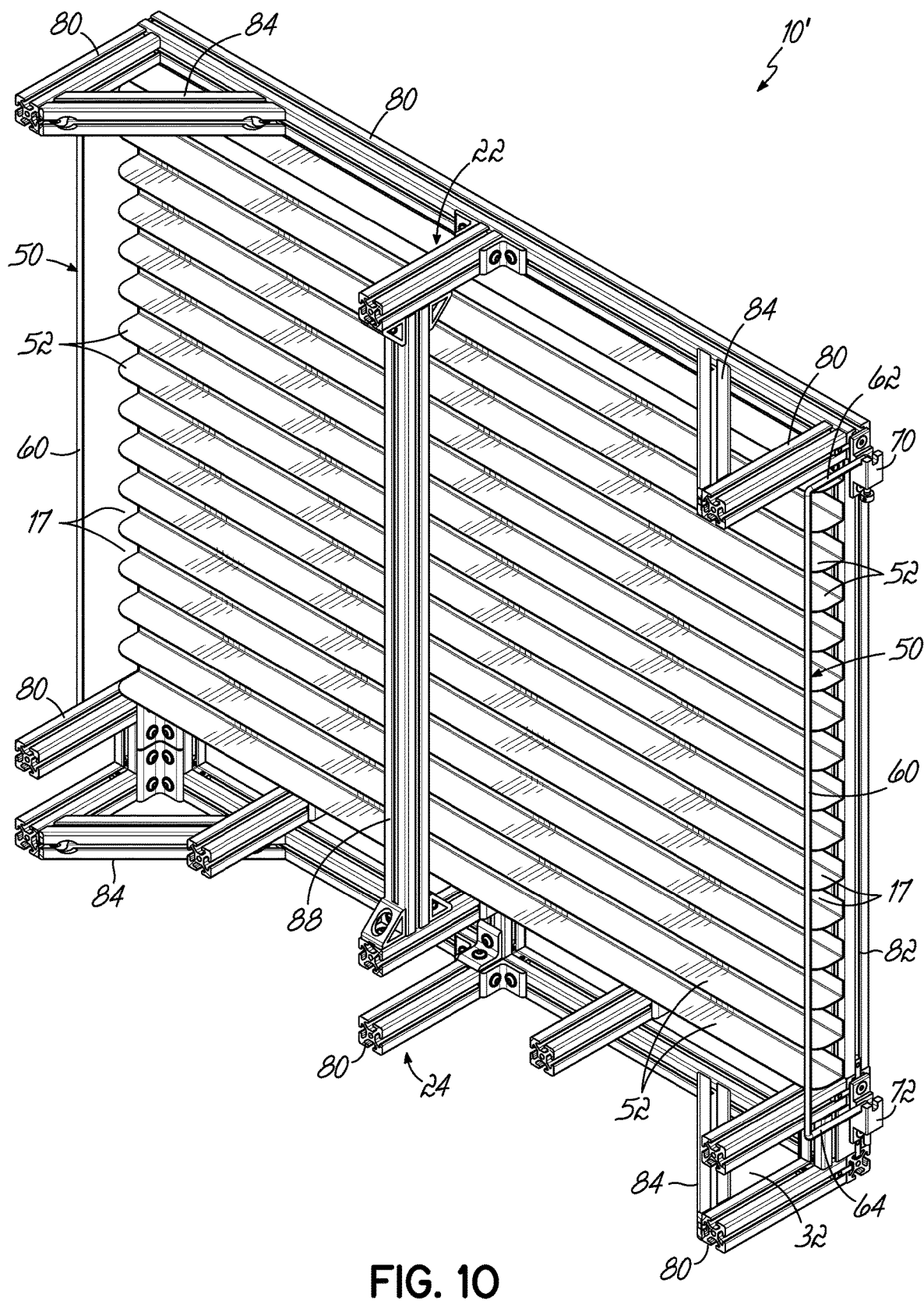
FIG. 10 is a cross sectional view showing the interior of the rack illustrated in FIG. 9.
Figure 11:
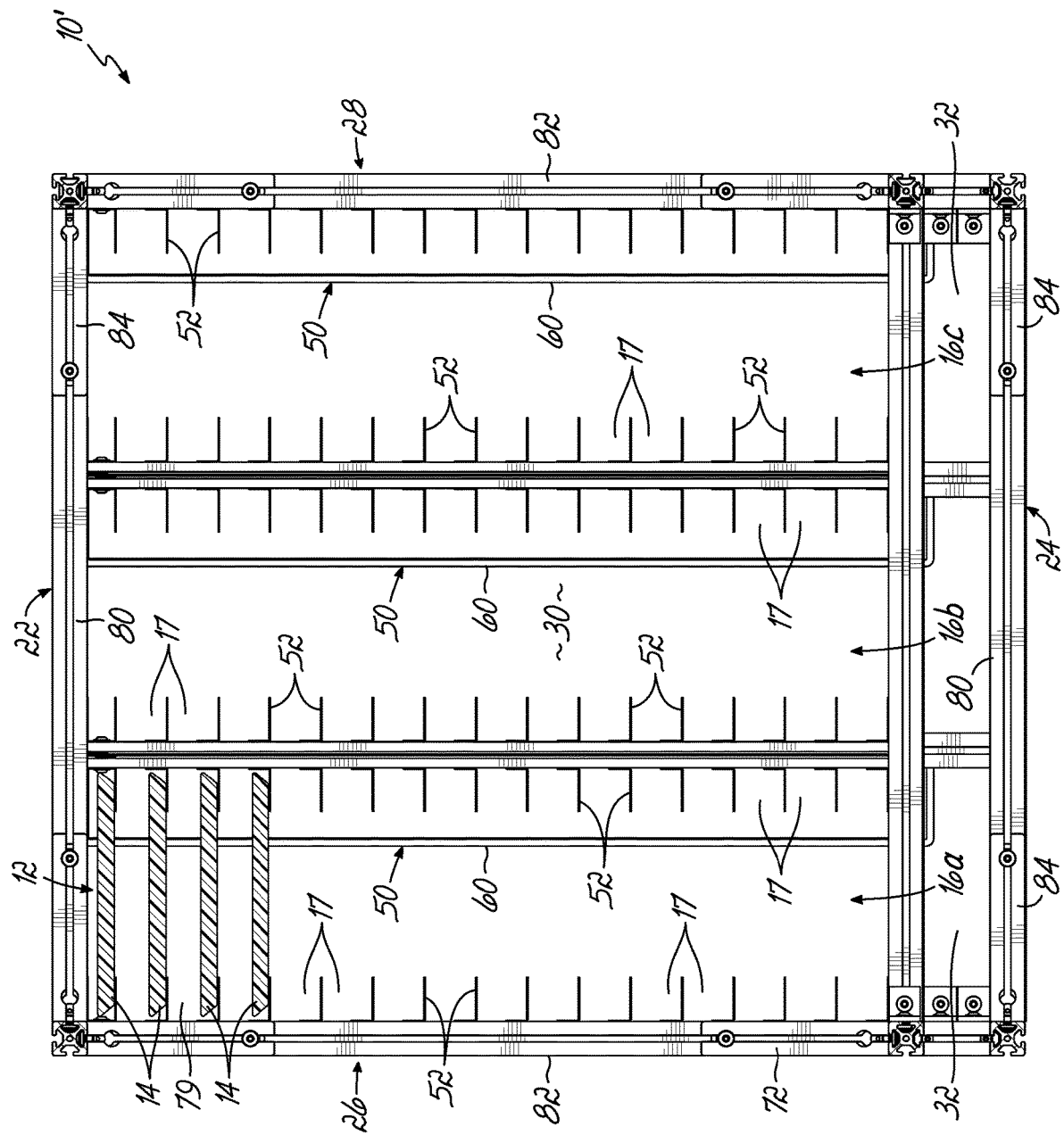
FIG. 11 is an elevational view illustrating the interior of the rack shown in FIG. 8 containing several PCM panels in spaced apart arrays within each slot or shelf of the rack.

FIGS. 8 through 11 illustrate another alternative and exemplary embodiment of a storage rack 10' for holding and transporting PCM panels 14. Because of the similarities between the first and second embodiments, like reference numerals will be used for like structure of each embodiment and, for this reason, repetitive description of such duplicate structure is not necessary. Structure that is referenced with like reference numerals having prime (') marks is substantially similar to corresponding structure of the first embodiment, but with differences that will be either apparent from the drawings or further described hereinbelow. This storage rack 10' is very similar to the storage rack 10 described and shown with regard to the first embodiment, but is constructed with frame members 80, 82, 84 that are formed from lighter, extruded material such as aluminum. Unlike the first embodiment, the frame members 80, 82, 84 of this second embodiment mechanically connect and lock together, with or without additional fasteners, as opposed to being welded together. In addition, the slots 17 and associated flanges 52 are shown to be spaced apart in a vertical direction such that PCM panels 14 are held in a single layer within each slot 17 as shown in FIG. 11. In this regard, the vertical height of each slot 17 as defined between vertically spaced, adjacent flanges 52 is sufficient to allow air flow between the upper surface of one panel 14 and the lower surface of an adjacent, vertically spaced panel 14. But, the air space is not sufficient to allow one panel 14 to slide on top of or overlap another panel 14 in the same slot during transit, for example.

Based on FIG. 9, it will be appreciated that this storage rack 10' may utilize the same PCM panel securing mechanisms 50 as described and shown with respect to the first embodiment. As best illustrated in FIG. 10, a central, vertical frame member 88 is mounted so as to bisect the front and rear compartments 16a-16f of the storage rack 10', internally, to act as a stop for the PCM panels 14 in adjacent front and rear compartments 16a, 16d and 16b, 16e and 16c, 16f. This corresponds to the vertical frame members 78 of the first embodiment, and is utilized between each of the adjacent front and rear compartments 16a-16f of the second embodiment. As with the first embodiment, the storage rack 10' is accessed from both the front and rear sides 18, 20 and each of the three compartments 16a, 16b, 16c and 16d, 16e, 16f associated respectively with the front and rear sides 18, 20 includes an associated PCM panel securing mechanism 50 movable between open and closed positions as previously described. Like the first embodiment, this creates six overall compartments 16a-16f of shelves or slots 17 for receiving respective, spaced apart PCM panels 14 during storage, transportation and conditioning to be described below, and provides easier access to the user as well as quicker loading and unloading operations for the PCM panels 14.

Figure 12:
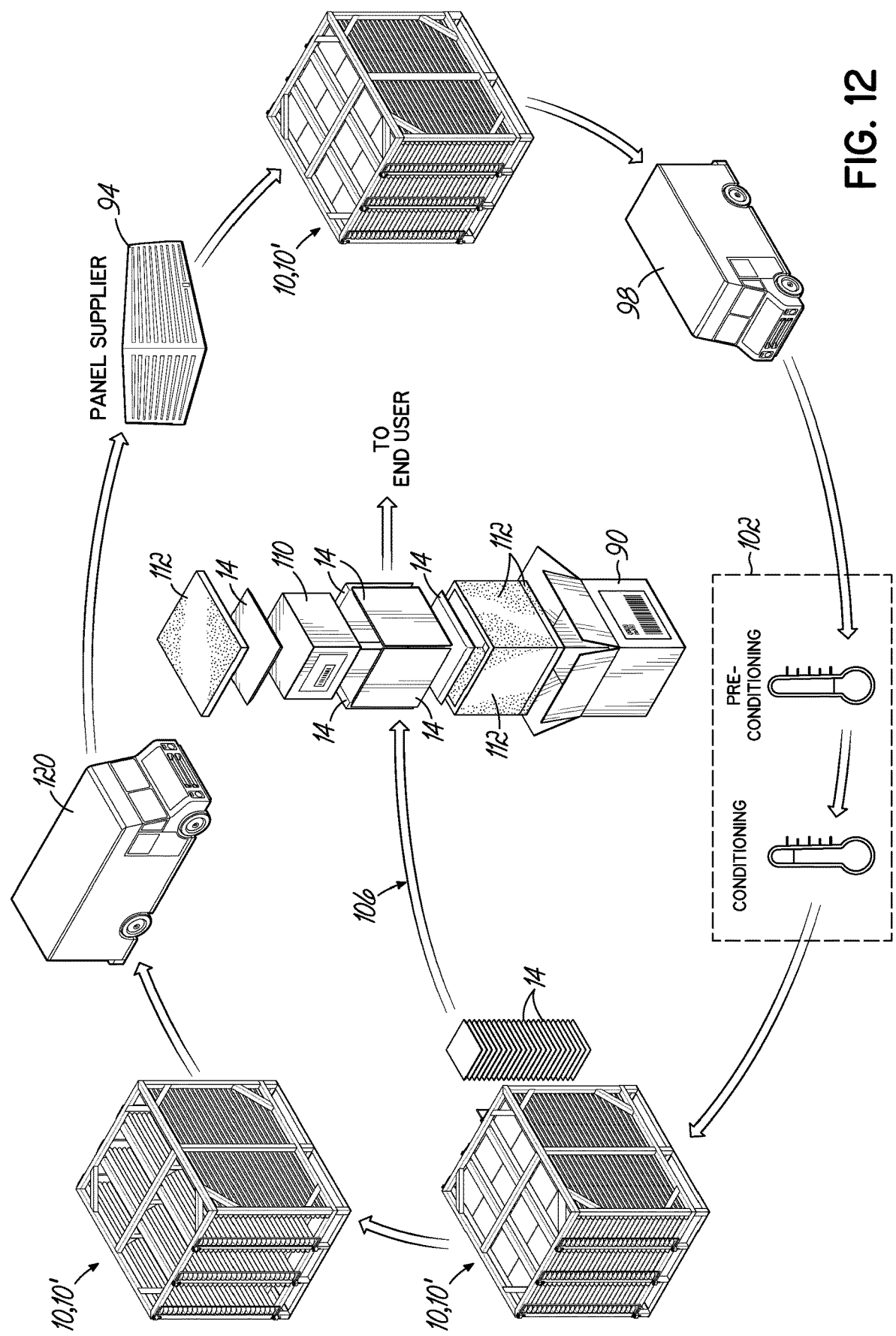
FIG. 12 is a schematic view illustrating an exemplary transportation process for handling the PCM panels, conditioning the PCM panels, and ultimately using the PCM panels to pack a shipping container of temperature sensitive product.

FIG. 12 illustrates an exemplary process for utilizing flat PCM panels 14 in conjunction with either of the storage racks 10, 10' described above and, specifically, transporting and conditioning those panels 14 prior to using the panels 14 in an insulated shipping container 90 to transport temperature sensitive items. More specifically, the storage rack 10, 10' is filled with respective PCM panels 14 at a panel supplier 94. The panel supplier 94 then transports the loaded storage rack 10, 10' in a vehicle, such as a truck 98, to a packaging facility 102 for packaging a temperature sensitive product at a remote location relative to the panel supplier 94. This packager 102 may also be the manufacturer of the product, or may be any other entity involved with packaging temperature sensitive products or items. In accordance with a method to be further detailed below, the PCM panels 14 are subjected to a pre-conditioning step and a conditioning step at the packaging facility 102 to bring each of the panels 14 contained in the storage rack 10, 10' to the required temperature range. At a subsequent step 106, the PCM panels 14 are unloaded from the storage rack 10, 10' and individually used within a shipping container 90 to package temperature sensitive items or product that may be contained in a separate inner container 110. Specifically, the shipping container may include vacuum insulated panels (VIPs) 112, as shown, to line all six sides of the shipping container or box 90. The insulated panels 112 are then lined by six abutting and vertically oriented PCM panels 14 on four side walls as well as on a top side and a bottom side. The fully packaged, insulated and temperature controlled shipping container is then transported in a vehicle, such as a truck (not shown), to another location. This may be the location of ultimate use such as by a consumer or other end user of the packaged, temperature sensitive items. Once emptied, the storage rack 10, 10' may be transported in a subsequent step within a vehicle 120 back to the remote panel supplier 94 for refilling and the process may be repeated. Alternatively, the empty storage rack 10, 10' may be retained at the packaging location 102 and the panel supplier 94 may bulk ship unconditioned PCM panels 14 to the packaging location 102. Depending on the process, personnel at the PCM panel supplier 94 can refill the storage rack 10, 10' with unconditioned PCM panels 14 or, if the empty rack 10, 10' is not transported to the panel supplier 94, then simply pack conventional boxes or other shipping containers (not shown) with unconditioned PCM panels 14 and ship them to the packager 102. In either case, the pre-conditioning and conditioning steps may be performed generally as previously described with the only difference being the location at which the PCM panels 14 are loaded into the rack 10, 10'.

The pre-conditioning and conditioning steps more specifically include moving the storage rack 10, 10' loaded with PCM panels 14 directly into a "pre-conditioning" unit such as a freezer (not shown) held at an interior temperature of −20° C. to cause PCM to become solid (frozen). Air may continuously or intermittently circulate within the freezer and within gaps 79 (FIGS. 5 and 7) to assist with the cooling or pre-conditioning process. After a defined period of, typically, several hours, the loaded rack 10, 10' of PCM panels 14 is transferred to another cooling or conditioning unit, which may be a refrigerator (not shown) with an interior held at 5° C. In this regard, the conditioning temperature, or refrigeration temperature, may be approximately at or slightly above the phase change temperature of the PCM. The loaded rack 10, 10' of PCM panels 14 is maintained in the refrigerator during this "conditioning" step to achieve the desired PCM panel temperature. In this example, the desired PCM panel temperature range is +2° C. to +3.2° C. Other illustrative examples are described below. One aspect of the invention, present in many illustrative embodiments, is for the flat PCM panels 14 to be configured in parallel, horizontal orientations, both in the pre-conditioning step and in the conditioning step. The panels 14 are held in horizontal orientations to prevent air bubbles from forming within the panels 14. In many preferred embodiments, this is achieved using a rack 10, 10' in which the PCM panels 14 are supported, both in a freezer having an interior temperature at between e.g., −25° C. and −15° C. and in a refrigerator at between, e.g., +2° C. and +8° C. (when the target temperature range is +2° C. to +8° C.). In many forms of the invention having a pre-conditioning step and a conditioning step, the rack 10, 10' may be used to hold the panels 14 during the pre-conditioning step, and then the panels 14 may be retained in the rack 10, 10' and transported to the site of the conditioning step. Again, without removing the panels 14 from the rack 10, 10', the conditioning step may be performed, such as described herein.

Once the panels 14 have each achieved the required temperature range, the entire storage rack 10, 10' full of conditioned PCM panels 14 may remain in the conditioning unit during the packaging operation. In this regard, the conditioning unit may be a refrigerated area or cold room sufficiently sized to serve as a packaging area. Here, the panels 14 are individually used to package temperature sensitive products or items as previously described, such as by lining an insulated shipping container. It certain other embodiments, packaging occurs in a cold room or second refrigerator separate from the pre-conditioning unit or freezer and after the conditioning step. That separate cold room or refrigerator could be set at the same temperature as the conditioning unit or refrigerator (e.g., +5° C.), or could be maintained at a lower or higher temperature, still typically within the target payload temperature range (e.g., +2° C. to +8° C.). In such instances, the rack 10, 10' partially or completely loaded with PCM panels 14 can be transported from a pre-conditioning unit (e.g., freezer) to the conditioning unit (e.g. refrigerator), and then to a packaging area (e.g., second refrigerator or cold room) using a pallet transport device (mechanical or electromechanical) or using wheels or other known mechanisms.

In certain embodiments, the rack 10, 10' is loaded with PCM panels 14 in the vicinity of the pre-conditioning unit (e.g., freezer) either: (a) from containers containing vertically-stacked PCM panels 14 or (b) from PCM panels 14 returned from end-users. In certain other embodiments, the rack 10, 10' is loaded with PCM panels 14 at or near the location at which the PCM panels 14 are manufactured (without ever being inserted in vertically-stacked sets in a container, and then transported (e.g., by truck) to a location where the pre-conditioning unit and/or conditioning unit are located.

During any transit or queue time, the panels 14 should be maintained within the required temperature range. As such, with this temperature range achieved during the pre-conditioning and conditioning steps, the temperature sensitive items or products will be maintained during shipment within a required temperature range of 2° C. to 8° C. for a defined period of time. As another optional step in the process, used PCM panels 14 may be retrieved or returned from customers or other end users to a location where these panels 14 may be loaded into empty storage racks 10, 10' to subsequently be placed in the pre-conditioning freezer for repeating the pre-conditioning and conditioning steps described above. The temperature sensitive items that could be packaged in accordance with aspects of this invention include, for example, vaccines, blood and blood products for transfusion and/or manufacturing into other products, allergenic extracts, which are used for both diagnosis and treatment (for example, allergy shots), human cells and tissues used for transplantation (for example, tendons, ligaments and bone), gene therapies, cellular therapies and tests to screen potential blood donors for infectious agents, and the possible end users include, for example, facilities associated with patients on clinical trials and customers/patients of commercialised pharmaceutical products.

More specifically, for applications in which the payload temperature range is +2° C. to +8° C., the phase change temperature of the PCM may be in the range of +3.8° C. to +4.6° C. In some such embodiments, the PCM-containing panels 14 are first pre-conditioned at a temperature of −15° C. or below and then conditioned at a temperature of 4° C. or above. For example, during the pre-conditioning step, the panels 14 are kept in a freezer or pre-conditioning unit set at a temperature of −20° C. for a time sufficient to ensure that all of the phase change material in the panels 14 is in the solid state. The panels 14 are then transferred to a conditioning unit with an interior temperature set at +5° C. for a time sufficient to bring the panels 14 to a temperature of at least 2° C., but less than the melting point of the phase change material in the panels 14. If, for example, the PCM has a melting point of 4° C., the temperature of the PCM in the panels 14 may be gradually raised to a temperature in the range of +2.0 to +3.2° C. The goal for total pre-conditioning time is less than or equal to 24 hours and, likewise, the goal for total conditioning time is less than or equal to 24 hours, but various factors could change these goals. This latter conditioning step may be performed in a refrigeration space such as the interior of a refrigerator designed for that purpose or the interior of a large, refrigerated room or work area. As mentioned above, such a work area may also be used to then package items within insulated containers 90 (FIG. 12) utilizing the PCM panels 14 as liners for the container 90.

In preferred embodiments, the pre-conditioning unit (e.g., freezer) and conditioning unit (e.g., refrigerator) are each configured and equipped to provide airflow sufficient to enable uniform temperature changes of the PCM panels 14 and then to maintain a constant temperature within a range needed for the process, as described herein.

The following table illustrates several examples, based upon payload temperature ranges other than +2° C. to +8° C.:

| Payload target temperature range | PCM melting point | Pre-conditioning temperature | Conditioning temperature | PCM panel temperature range after preconditioning/ conditioning |
|---|---|---|---|---|
| +2° C. to +10° C. | +6° C. | −20° C. | +5° C. | 4° C. to 6° C. |
| +15° C. to +25° C. | +22° C. | Summer shipping: no pre-conditioning needed Winter Shipping: +24° C. | +22° C. | +20° C. to +22° C. Summer +22° C. to +24° C. Winter |
| −15° C. to −25° C. | −20° C. | −40° C. | −20° C. | −20° C. to −25° C. |
| −25° C. to −20° C. | −23° C. | −40° C. | −20° C. | −23° C. to −25° C. |
| <−40° C. | −50° C. | −70° C. | None required | <−50° C. |

If the PCM panels 14 are at a temperature of +2° C. to +3.1° C. in a refrigerator or conditioning area maintained at 5° C., the temperature sensitive items may also be at 5° C. or another temperature within the +2° C. to +8° C. range at the time of packaging the items. The other packaging materials, including VIPs 112 (FIG. 12), may also be maintained at 5° C. or may be maintained at a different (higher or lower) temperature within or (typically) above the +2° C. to +8 C° target range for the temperature sensitive items.

The racks 10, 10' of the present invention may also be used in conditioning methods for PCM panels designed for lower payload target temperature ranges (such as −15° C. to −25° C.) or designed for higher payload target temperature ranges (such as +15° C. to +25° C. or +20° C. to +24° C.). For example, using a PCM material having a melting temperature near −20° C. (e.g., a melting temperature range of −19° C. to −20° C.), the pre-conditioning freezer can be operated at −40° C. for a time sufficient to convert all or essentially all of the Phase Change Material in the PCM panels 14 into the solid phase. In place of a conditioning refrigerator, one could use a −20° C. freezer operated at a temperature of −19° C.

PCM panels 14 containing a Phase Change Material with a melting temperature range near +20° C., supported in one of the racks 10, 10' as described above can be pre-conditioned (i.e., converted to all sold phase PCM) using a refrigerator at a temperature of 2° C.-5° C. or using a freezer at a temperature of −10° C. The filled rack 10, 10' can then be moved to a constant temperature room, maintained at +18° C. or at +19° C., to warm the PCM panels 14 to nearly 20° C., but not cause significant melting of the PCM in the panels 14. This approach, keeping the PCM material entirely or almost entirely solid, is most often used if the fully packaged payload is likely to be exposed to hot environmental conditions (over 25° C.) during the summer or in especially warm year-long climates (for example, in tropical conditions).

A rack 10, 10' can also be used to condition PCM panels for a +15° C. to +25° C. or +20° C. to +24° C. target payload range, where the concern is either entirely too cold environmental conditions (as in the winter or in polar conditions) or where the concern is excursions either below +15° C. or above +25° C. (as in the Spring or Fall) or when the packaged payload is at risk of exposure in the open air (below +15° C.) or in a room or truck that may be above +25° C. Where the risk is a climate that is too cold, the PCM panels 14 on the rack 10 or 10' can be converted to all liquid PCM in a pre-conditioning step in an incubator at +40° C. or higher. Then, for conditioning, the rack 10 or 10' filled with PCM panels can be moved to a room or incubator maintained between about +24° C. and about 27° C.

Where the concern is excursions in either direction, the PCM in panels 14 on the rack 10 or 10' can be brought to a mixture of liquid and sold phases by pre-conditioning either: (a) at a low temperature to make the PCM all solid, or (b) at a high temperature to make the PCM all liquid. The conditioning step, conversely, would either (a) melt the solid PCM in a room above 25° C. until about half of the PCM in each panel 14 was liquid, or (b) freeze the liquid PCM in a room below 15° C. until about half of the PCM in each panel 14 had frozen into the solid phase.

In each of these scenarios, like the scenarios targeting a +2° C. to +8° C. payload target temperature, the racks 10, 10' and methods of the present invention can take advantage of the uniform cooling and warming of PCM in PCM panels 14 to efficiently and uniformly condition sets of panels 14. This will result in optimally protecting the ultimate payload against temperature excursions outside of the desired payload temperature range.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A rack for holding flat panels containing phase change material (PCM) while the flat panels are conditioned, comprising:
    a frame structure including a front side, a rear side, a top side, a bottom side, and at least two additional sides to define an interior, the frame structure formed from a plurality of frame members through which a conditioning air flow is adapted to be directed, the interior including a plurality of vertically spaced shelves for supporting the flat panels in a vertically spaced apart arrangement, with each of the vertically spaced shelves being located immediately adjacent to a respective adjoining one of the vertically spaced shelves, wherein each of the flat panels includes an upper surface and a lower surface, and the shelves are configured to hold the flat panels with at least a majority of the upper and lower surfaces in contact with the conditioning air flow; and
    first and second flanges spaced apart in a horizontal direction and fixed to respective frame members to define each of the vertically spaced shelves, the first and second flanges extending toward each other to define a slot for receiving at least one of the flat panels alongside edge portions thereof and creating an air space between the first and second flanges for exposing a majority of the upper and lower surfaces of the flat panel to the conditioning air flow,
    wherein the shelves are configured in at least first and second compartments to form respective first and second vertical arrangements of the shelves having respective first and second front openings accessed from the front side of the rack, and
    wherein each of the slots is configured so as to permit the flat panels to be loaded into, and unloaded entirely from, the slots.

2. The rack of claim 1, further comprising respective third and fourth compartments containing shelves positioned respectively adjacent the first and second compartments, the third and fourth compartments each including a rear opening accessed from the rear side of the rack.

3. The rack of claim 2, further comprising:
    a first stop element fixed between the first compartment and the third compartment for preventing movement of the flat panels between the first and third compartments; and
    a second stop element fixed between the second compartment and the fourth compartment for preventing movement of the flat panels between the second and fourth compartments.

4. The rack of claim 1, further comprising:
a first panel securing mechanism movable between open and closed positions, the first panel securing mechanism allowing flat panels to be loaded onto the shelves of the first compartment and unloaded from the shelves of the first compartment when in the open position and retaining the flat panels on the shelves of the first compartment when in the closed position; and
a second panel securing mechanism movable between open and closed positions, the second panel securing mechanism allowing flat panels to be loaded onto the shelves of the second compartment and unloaded from the shelves of the second compartment when in the open position and retaining the flat panels on the shelves of the second compartment when in the closed position.

5. The rack of claim 4, wherein the first and second panel securing mechanisms respectively further comprise first and second vertically extending elements, the first vertically extending element blocking the first, front opening when in the closed position and unblocking the first, front opening when in the open position and the second vertically extending element blocking the second, front opening when in the closed position and unblocking the second, front opening when in the open position.

6. A method of conditioning a plurality of flat panels containing phase change material (PCM) to bring the PCM in each flat panel into a required temperature range, comprising:
arranging the flat panels in a spaced apart array in respective slots of a rack comprising a plurality of vertically spaced shelves defining the respective slots, with each of the vertically spaced shelves being located immediately adjacent to a respective adjoining one of the vertically spaced shelves, to create air flow channels between adjacent upper and lower surfaces of the flat panels, the slots of the rack each being defined by flanges extending toward one another and leaving a central space to expose the upper and lower surfaces of the flat panels with each of the slots being configured so as to permit the flat panels to be loaded into, and unloaded entirely from, the slots, and
circulating air between and in contact with the upper and lower surfaces of the flat panels at a first temperature sufficient to bring the temperature of the PCM in each flat panel at least closer to the required temperature range.

7. The method of claim 6, wherein the step of circulating air further comprises:
preconditioning the flat panels by circulating air between and in contact with the upper and lower surfaces of the flat panels at a first temperature sufficient to convert at least some of the PCM in each flat panel from the liquid phase to a solid phase wherein the first temperature is less than or equal to 0° C., and
conditioning the flat panels by holding the flat panels in the rack at a second temperature that is higher than the first temperature thereby raising the temperature of the PCM in each flat panel into the required temperature range.

8. The method of claim 7, wherein the step of preconditioning the flat panels further comprises:
preconditioning the flat panels by circulating air between and in contact with the upper and lower surfaces of the flat panels at a first temperature sufficient to convert at least some of the PCM in each flat panel from the liquid phase to a solid phase wherein the first temperature is less than or equal to −5° C.

9. The method of claim 7, wherein the step of preconditioning the flat panels further comprises:
preconditioning the flat panels by circulating air between and in contact with the upper and lower surfaces of the flat panels at a first temperature sufficient to convert at least some of the PCM in each flat panel from the liquid phase to a solid phase wherein the first temperature is less than or equal to −10° C.

10. The method of claim 7, wherein the step of preconditioning the flat panels further comprises:
preconditioning the flat panels by circulating air between and in contact with the upper and lower surfaces of the flat panels at a first temperature sufficient to convert at least some of the PCM in each flat panel from the liquid phase to a solid phase wherein the first temperature is less than or equal to −15° C.

11. The method of claim 7, wherein raising the temperature of the PCM in each flat panel further comprises:
raising the temperature of the PCM into the required temperature range but below a PCM melting temperature range of the PCM.

12. The method of claim 7, wherein raising the temperature of the PCM in each flat panel further comprises:
raising the temperature of the PCM into the required temperature range but below a midpoint of the PCM melting temperature range of the PCM.

13. The method of claim 7, further comprising:
loading the flat panels into the rack at a panel supplier prior to pre-conditioning and conditioning of the flat panels,
shipping the rack of flat panels from the panel supplier to a remote location, and
performing the pre-conditioning and conditioning steps at the remote location.

14. The method of claim 13, further comprising:
unloading the conditioned panels from the rack,
using the conditioned panels to package temperature sensitive items within insulated shipping containers, and
shipping the temperature sensitive items in the insulated shipping containers while maintaining the temperature sensitive items within the required temperature range.

15. The method of claim 6, further comprising:
loading the flat panels into the rack at a panel supplier prior to pre-conditioning and conditioning of the flat panels,
shipping the rack of flat panels from the panel supplier to a remote location, and
performing the pre-conditioning and conditioning steps at the remote location.

16. The method of claim 15, further comprising:
unloading the conditioned panels from the rack,
using the conditioned panels to package temperature sensitive items within insulated shipping containers, and
shipping the temperature sensitive items in the insulated shipping containers while maintaining the temperature sensitive items within the required temperature range.

17. The method of claim 6, further comprising:
unloading conditioned panels from the rack,
using the conditioned panels to package temperature sensitive items within insulated shipping containers, and shipping the temperature sensitive items in the insulated shipping containers while maintaining the temperature sensitive items within the required temperature range.

18. The method of claim 6, further comprising:
loading the flat panels through an access opening of the rack into a compartment and in the spaced apart slots to create air flow channels between adjacent upper and lower surfaces of the flat panels, and
placing a securing mechanism into a closed position relative to the access opening to secure the flat panels in the compartment.

19. The method of claim 6, further comprising:
loading the flat panels through both front and rear access openings of the rack into respective front and rear compartments in the spaced apart slots to create air flow channels between adjacent upper and lower surfaces of the flat panels, and
placing front and rear securing mechanisms into closed positions relative to the respective front and rear access openings to secure the flat panels in the front and rear compartments.

20. A method of conditioning a plurality of flat panels containing phase change material (PCM) in a liquid phase to bring the PCM in each flat panel into a required temperature range, comprising:
loading the flat panels through both front and rear access openings of a rack into respective front and rear compartments in vertically spaced apart slots to create air flow channels between adjacent upper and lower surfaces of the flat panels, the slots of the rack each being defined by flanges extending toward one another and leaving a central space to expose the upper and lower surfaces of the flat panels with each of the slots being configured so as to permit the flat panels to be loaded into, and unloaded entirely from, the slots,
placing vertically extending front and rear securing mechanisms into closed positions relative to the respective front and rear access openings to secure the flat panels in the front and rear compartments,
preconditioning the flat panels by circulating air between and in contact with the upper and lower surfaces of the flat panels at a first temperature sufficient to convert at least some of the PCM in each flat panel from the liquid phase to a solid phase, wherein the first temperature is less than or equal to 0° C., and
conditioning the flat panels by holding the flat panels in the rack at a second temperature that is higher than the first temperature thereby raising the temperature of the PCM in each flat panel into the required temperature range.

21. A rack for holding flat panels containing phase change material (PCM) while the flat panels are conditioned, comprising:
a frame structure including a front side, a rear side, a top side, a bottom side, and at least two additional sides to define an interior, the frame structure formed from a plurality of frame members through which a conditioning air flow is adapted to be directed, the interior including a plurality of vertically spaced shelves for supporting the flat panels in a vertically spaced apart arrangement, wherein each of the flat panels includes an upper surface and a lower surface, and the shelves are configured to hold the flat panels with at least a majority of the upper and lower surfaces in contact with the conditioning air flow;
first and second flanges spaced apart in a horizontal direction and fixed to respective frame members to define each of the vertically spaced shelves, the first and second flanges extending toward each other to define a slot for receiving at least one of the flat panels alongside edge portions thereof and creating an air space between the first and second flanges for exposing a majority of the upper and lower surfaces of the flat panel to the conditioning air flow,
wherein the shelves are configured in at least first and second compartments to form respective first and second vertical arrangements of the shelves having respective first and second front openings accessed from the front side of the rack, and
wherein each of the slots is configured so as to permit the flat panels to be loaded into, and unloaded entirely from, the slots,
a first panel securing mechanism movable between open and closed positions, the first panel securing mechanism allowing flat panels to be loaded onto the shelves of the first compartment and unloaded from the shelves of the first compartment when in the open position and retaining the flat panels on the shelves of the first compartment when in the closed position, and
a second panel securing mechanism movable between open and closed positions, the second panel securing mechanism allowing flat panels to be loaded onto the shelves of the second compartment and unloaded from the shelves of the second compartment when in the open position and retaining the flat panels on the shelves of the second compartment when in the closed position.

22. A method of conditioning a plurality of flat panels containing phase change material (PCM) to bring the PCM in each flat panel into a required temperature range, comprising:
loading the flat panels through an access opening of a rack into a compartment,
arranging the flat panels in a spaced apart array in respective slots of the rack to create air flow channels between adjacent upper and lower surfaces of the flat panels, the slots of the rack each being defined by flanges extending toward one another and leaving a central space to expose the upper and lower surfaces of the flat panels with each of the slots being configured so as to permit the flat panels to be loaded into, and unloaded entirely from, the slots,
circulating air between and in contact with the upper and lower flat panels at a first temperature sufficient to bring the temperature of the PCM in each flat panel at least closer to the required temperature range, and
placing a securing mechanism into a closed position relative to the access opening to secure the flat panels in the compartment.

* * * * *